United States Patent
Al-Shammari et al.

(10) Patent No.: US 11,892,419 B2
(45) Date of Patent: Feb. 6, 2024

(54) DRONE-BASED NEUTRON BACKSCATTER INSPECTION SYSTEM

(71) Applicant: Saudi Arabian Oil Company, Dhahran (SA)

(72) Inventors: Ahmad A. Al-Shammari, Dammam (SA); Soliman A. Walaie, Dammam (SA); Ahmed M. Al-Ghamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 47 days.

(21) Appl. No.: 17/655,286

(22) Filed: Mar. 17, 2022

(65) Prior Publication Data

US 2023/0296537 A1 Sep. 21, 2023

(51) Int. Cl.
*G01N 23/204* (2006.01)
*B64C 39/02* (2023.01)

(52) U.S. Cl.
CPC ......... *G01N 23/204* (2013.01); *B64C 39/024* (2013.01); *B64U 2201/00* (2023.01)

(58) Field of Classification Search
CPC . G01N 23/204; B64C 39/024; B64U 2201/00
See application file for complete search history.

(56) References Cited

U.S. PATENT DOCUMENTS

| 10,810,501 | B1* | 10/2020 | Kimchi | G06N 20/00 |
| 2017/0227669 | A1* | 8/2017 | Kulcinski | G01V 5/0016 |
| 2018/0335404 | A1 | 11/2018 | Amer et al. | |
| 2020/0369408 | A1 | 11/2020 | Dolata et al. | |

OTHER PUBLICATIONS

Simpleoilfield; DroneMat; EMAT Ultrasonic Thickness Gauge for Industrial UAVs; 12 pages.
International Search Report and Written Opinion in corresponding PCT Application No. PCT/US2023/064053, dated Jun. 29, 2023, 13 pages.
Eltai Elsadig O. et al.: Severity of corrosion under insulation (CUI) to structures and strategies to detect it; Corrosion reviews; vol. 37, No. 6; Sep. 20, 2019 pp. 553-564.; 12 pages.

* cited by examiner

*Primary Examiner* — David P Porta
*Assistant Examiner* — Fani Polyzos Boosalis
(74) *Attorney, Agent, or Firm* — Leason Ellis LLP

(57) ABSTRACT

An apparatus for inspection of a target asset comprises a drone including a body, one or more propellers coupled to the body that enable the drone to fly, and an electronic control unit coupled to or positioned within the body of the drone and coupled to the one or more propellers. The apparatus also comprises a neutron emission source and a neutron detector that are both coupled to the body of the drone and also communicatively coupled to the electronic control unit. The electronic control unit is configured to control navigation of the drone to reach the target asset, to activate the neutron emission source to radiate neutrons onto the asset and to gather data from the neutron detector which detects neutrons backscattered from the asset, indicative of a state of the asset and materials contained within the asset.

14 Claims, 6 Drawing Sheets

DRONE-BASED NEUTRON BACKSCATTER INSPECTION SYSTEM

FIELD OF THE DISCLOSURE

The present disclosure relates generally to non-destructive testing (NDT) of oil and gas assets such as pipes, vessels, tanks and other equipment, and more particularly relates to a system and method of using a remotely operated vehicle such as a drone to inspect such assets using neutron backscattering inspection suitably configured and arranged hardware components.

BACKGROUND OF THE DISCLOSURE

NDT techniques have been used for some time in the oil and gas industry because it allows structural testing of assets to be performed without having to take remove insulation and without having to take the assets offline, with all of the losses and delays that entails. For example, ultrasonic, eddy current and infrared-based techniques have all been employed in inspections of infrastructural assets. Some of these techniques can detect the amount of corrosion or build-up inside the structural components under insulation.

Neutron backscattering is a somewhat different inspection technique that employs a radioactive source to emit high-energy into the medium to be inspected. A portion of the neutrons are absorbed by the medium, while another portion is back-scattered in the direction of the source where they can be detected by an associated neutron detector. The composition of the medium, particularly the interfaces between different components such as liquids and vapors can be inferred from the backscattered neutron profile. The magnitude of the detected neutron signal is approximately proportional to the amount of hydrogen in front of the scanning head. Accordingly, interfaces between hydrogen rich liquids and vapors produce a large difference in signal. Interfaces between two liquids will normally record a difference depending on the hydrogen concentration of each (e.g., hydrocarbons versus water). Additionally, for the same reasons, neutron backscattering can detect water-based corrosion in structure (e.g., wet spots) due to the presence of hydrogen in water.

One of the difficulties in utilizing the neutron backscattering technique effective is that some of the structures targeted for examination are located in positions that are hard to reach using conventional neutron backscattering inspection equipment. For example, in highly elevated locations, the conventional practice tends to expose the operator to radiation due to the limited space to perform the inspection.

SUMMARY OF THE DISCLOSURE

The present disclosure describes an apparatus for inspection of a target asset comprises a drone including a body, one or more propellers coupled to the body that enable the drone to fly, and an electronic control unit having a hardware processor, the electronic control unit being coupled to or positioned within the body of the drone and coupled to the one or more propellers. The apparatus also comprises a neutron emission source and a neutron detector that are both coupled to the body of the drone and also communicatively coupled to the electronic control unit. The neutron emission source is arranged to radiate neutrons exteriorly toward the target asset. The electronic control unit is configured by code executing in the processor to control navigation of the drone to reach the target asset, to activate the neutron emission source to radiate neutrons onto the asset and to gather data from the neutron detector which detects neutrons backscattered from the asset, indicative of a state of the asset and materials contained within the asset.

In another aspect, the present disclosure describes a method of inspecting a target asset that comprises flying a drone equipped with neutron backscattering emission and detection equipment to the target asset, adjusting a distance between the drone and the target asset for inspection with the neutron backscattering emission and detection equipment, emitting neutrons from the neutron emission equipment onto the target asset, detecting neutrons backscattered from the target using the neutron detection equipment, moving the drone to scan over the target asset while emitting neutrons toward and detecting backscattered neutrons from the target asset, and assessing the internal content and state of the target asset according to data obtained from detecting the backscattered neutrons.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

The present disclosure describes a system and method that uses a remotely operated vehicle, such as but not limited to an airborne drone, to perform neutron backscatter inspection (for convenience, the term "drone" will be used to represent all types of remote operated vehicles).

Figure 1:
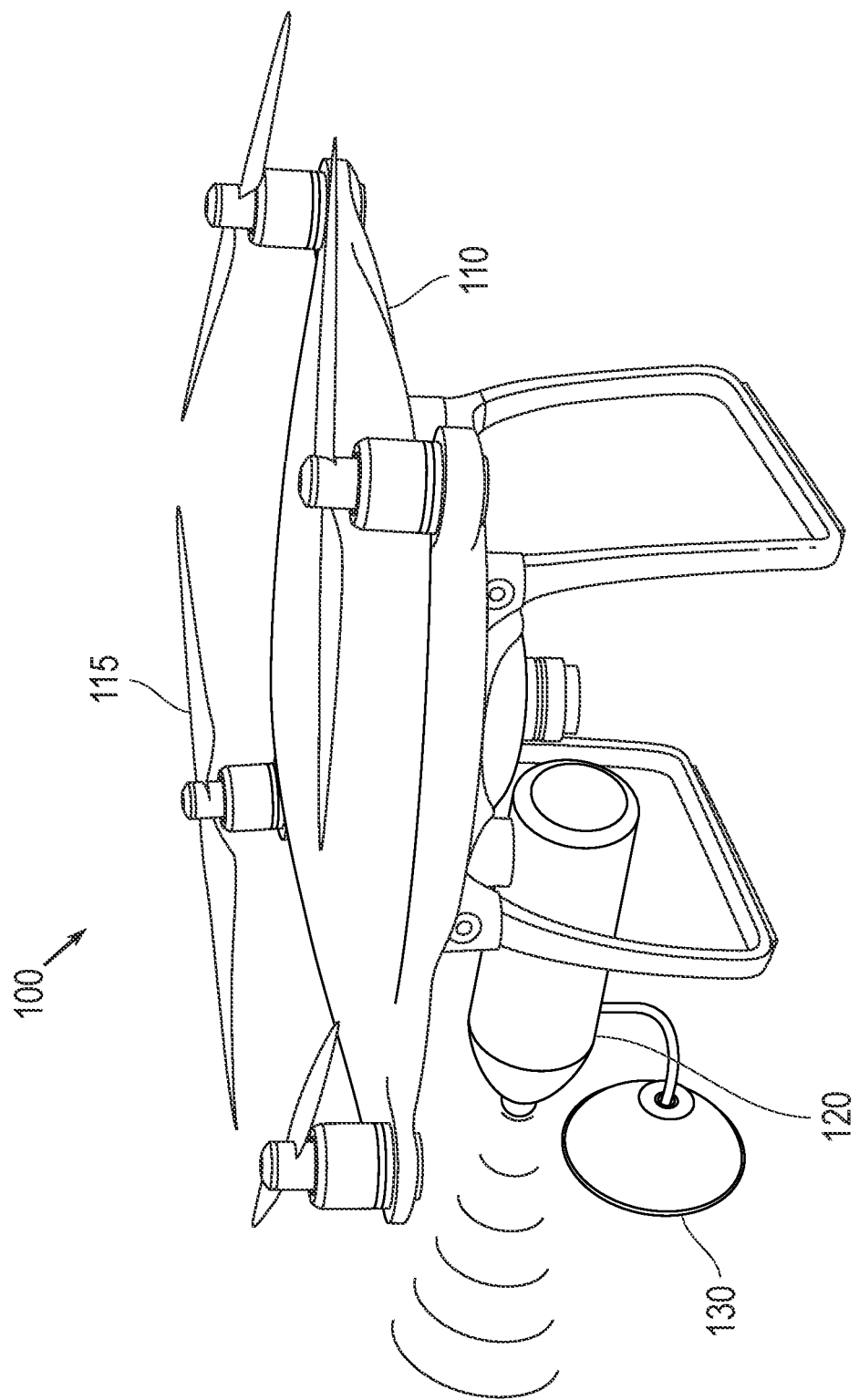
FIG. 1 is a perspective view of an exemplary drone with neutron emission and detection equipment according to an embodiment of the present disclosure.

FIG. 1 is a perspective view of a drone that is adapted for structural inspection of targeted assets by neutron backscattering. The drone includes a main body 110, a set of propellers e.g., 115, a radioactive neutron source (emitter) 120 and a neutron detector 130, which is preferably a digital detector, that measures backscattered neutron rays. The neutron emitter 120 can be based on combination of a radioisotope (such as Americium) and Beryllium. For example, when this combination is used, Americium emits alpha particles which cause ejection of neutrons upon impact with Beryllium. The neutrons emitted by the neutron emitter 130 are "fast" neutrons with energies of 0.5 to 1.1 MeV. The outlet neutron emitter 120 comprises an exposure window (not shown) that, in certain embodiments, can be electronically opened or closed to allow neutrons through or block neutrons from being emitted. In such embodiments, a shutter such as one responsive to a solenoid actuator can cycle between open and closed positions, wherein, in the open position, a channel enables the outlet neutron emitter 120 emit neutrons and wherein, in the closed position, the channel is impeded so as to discontinue emission of neutrons from the emitter 120. The neutron detector 130 by contrast detects (counts) thermal neutrons that have slowed (moderated) upon impact with the target structure. The neutron detector 130 can be based on $^3$He or another isotope that has a suitable cross-section for conversion of neutron impact to a secondary effect such as an electron emission. In operation, by targeting an asset with neutrons, the detection of neutrons backscattered from the asset provides information concerning the internal condition of the assets by determining distinct interfaces between solids, liquids and vapor. This is particularly useful for inspection of storage equipment, tanks and vessels. This information can further be used to identify and locate deposits, corrosion and clogs in separators, pipes, exchangers and under insulation.

Figure 2:
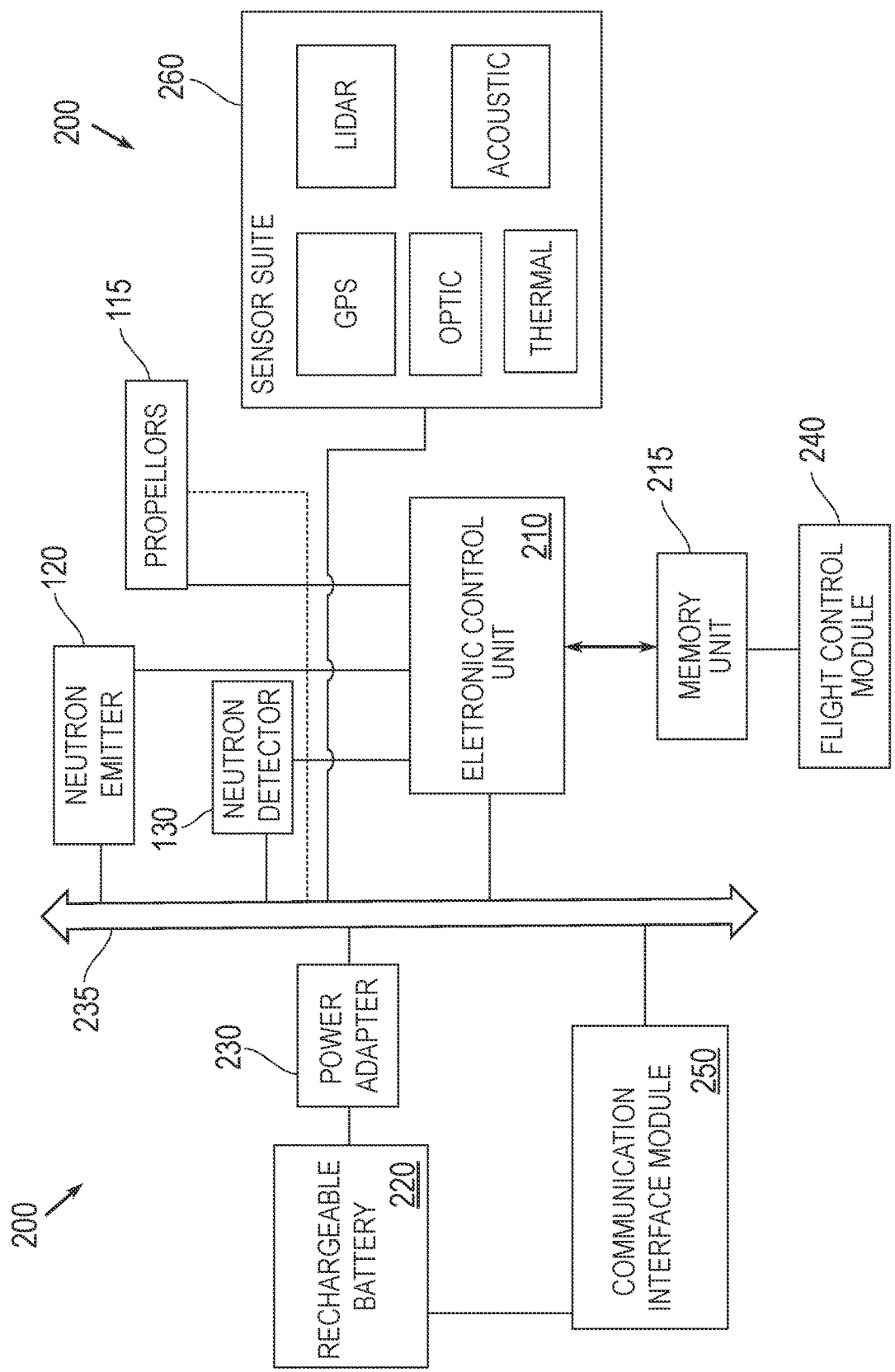
FIG. 2 is a schematic block diagram of a control system for the drone according to an embodiment of the present disclosure.

FIG. 2 shows a schematic block diagram of a control system for operating the drone 100. The control system 200 includes an electronic control unit 210 that can comprise a hardware microprocessor or application-specific circuit with accompanying an onboard memory unit 215. The control unit 210 is coupled to an onboard rechargeable battery 220 that provides direct current (DC) power via a power adapter 230 for the control unit as well as for the other components of the drone including the propellers 115, the neutron source emitter 120 and receiver 130. The power provided from the adapter can be distributed via a common power supply bus 235. In some implementations, the rechargeable battery 220 can be coupled to a tethered power system (not shown in FIG. 2) using, for example, a tether (shown in FIG. 3B) and a retractable cabling wench in order to extend the longevity of drone operation during neutron backscatter inspection operations. The control unit 210 is configured with a flight control and navigation program module 240 that includes software instructions for operating the propellers of the drone either according to a pre-programmed flight plan or instructions provided remotely by an operator via a communication interface module 250. Accordingly, the drone 100 can be flown manually, via remove operator control, semi-autonomously in which some of the movement and navigation of the drone is programmed or fully autonomously using the onboard flight controller and navigation system. A navigation sensor suite 260 includes GPS, LiDAR, acoustic, optic and thermal IR capabilities that provide data to aid in the flight control, provide mapping functionality and capture external structure condition & hotspots for 3D visualization.

The control unit 210 is configured to activate the neutron emitter 120 by opening and closing the radiation exposure window. As noted, the control unit is communicatively coupled to an operator device, such as a mobile device, that includes a programmed interface configured to enable an operator to control the components of the drone via communication with the control unit 210 including the opening/closing of the exposure window of the neutron emitter.

Figure 3B:
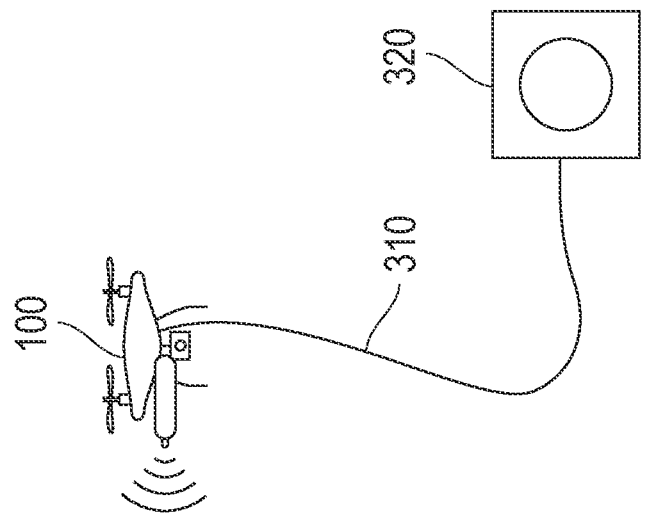
FIG. 3B is a schematic illustration of a drone with neutron emission and detection equipment and further including a tether for recharging via an external power supply approaching a target asset for inspection.
Figure 3B:
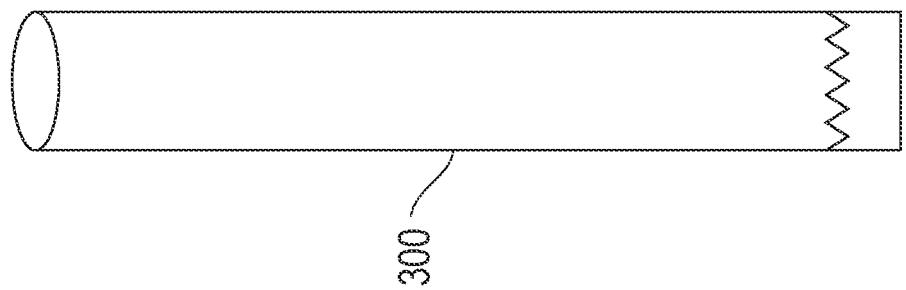
Figure 3A:
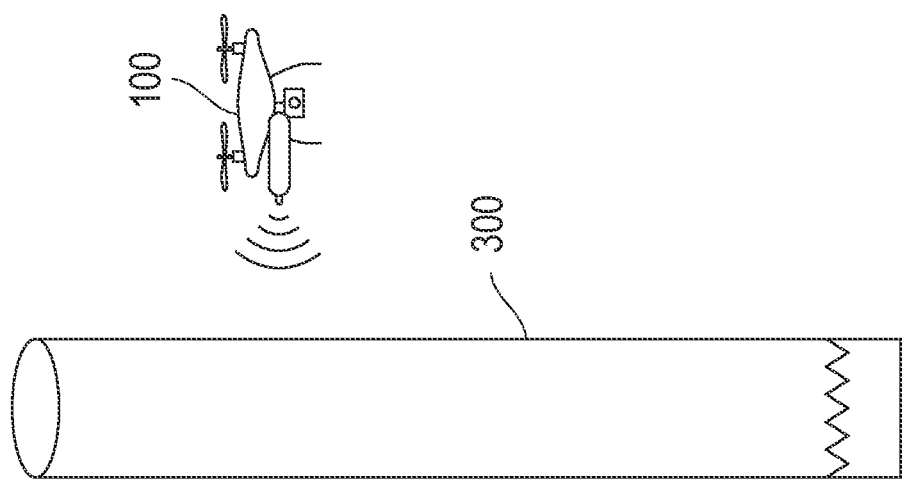
FIG. 3A is a schematic illustration of a drone with neutron emission and detection equipment approaching a target asset for inspection.

FIG. 3A is a schematic illustration of a drone 100 equipped with neutron backscattering detection equipment positioned in close proximately (e.g., approximately 1.5 to 2.5 meters) to a structure 300 for purposes of inspection. FIG. 3B is a schematic illustration of another implementation in which the drone 100 is equipped with a conductive tether 310 that couples the drone to a local power supply 320 for extended operation.

Figure 4:
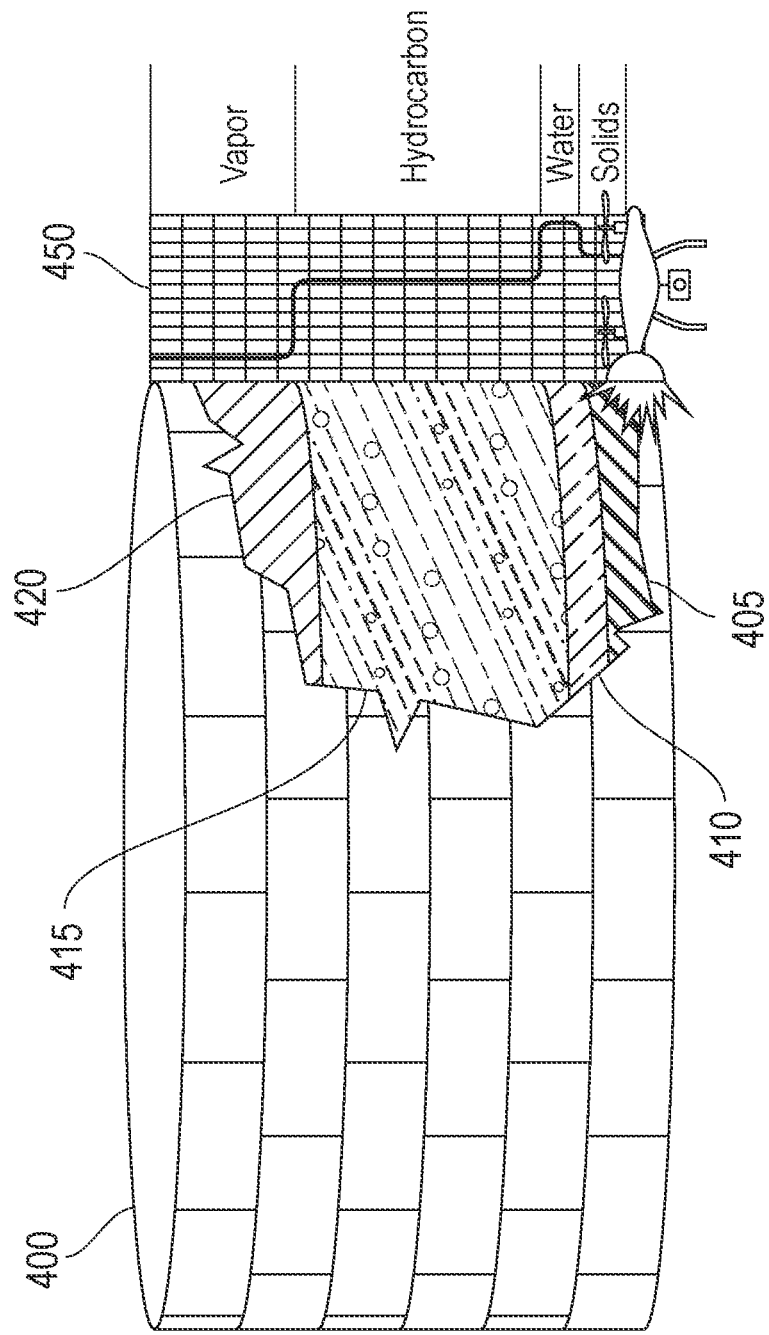
FIG. 4 is a schematic illustration depicting an inspection of the internal contents of a target storage asset using a drone with neutron emission and detection equipment according to an embodiment of the present disclosure.

FIG. 4 is a schematic illustration of an inspection of a storage structure (e.g., a tank) using a drone with neutron backscattering detection according to the present disclosure. In the illustration, a structure 400 stores four distinct layers of materials, from bottom to top: solids 405, water 410, hydrocarbon liquids 415 and vapor 420. The graph 450 shown above the drone 100 at the right marks shifts which are indications of the interfaces between the different layers. The interfaces are particularly marked when the hydrogen content of the interfacing layers differs significantly.

Figure 5:
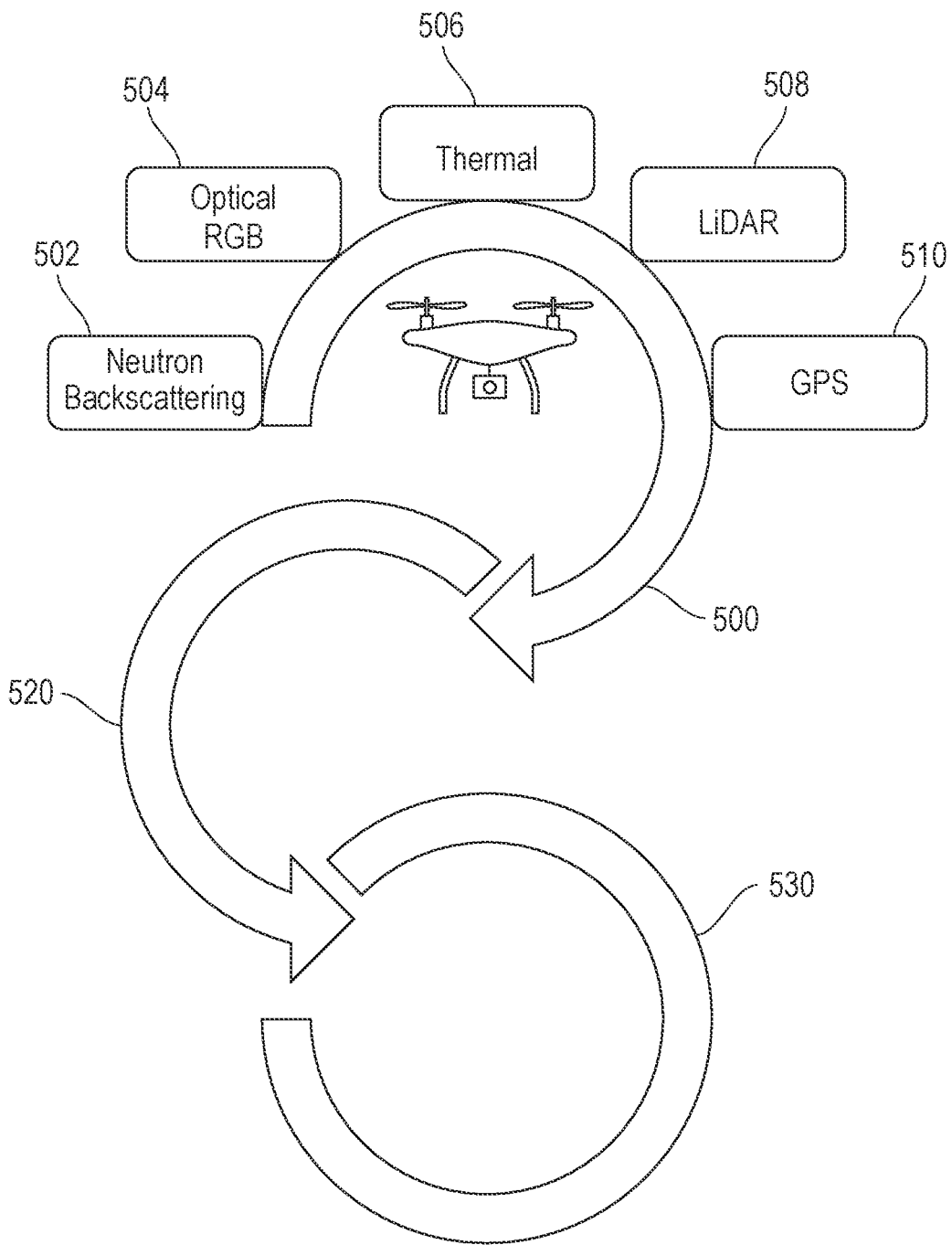
FIG. 5 is a schematic illustration depicting a general overview of an embodiment of a method of inspection using a drone with neutron emission and detection equipment according to an embodiment of the present disclosure.

The drone equipped with a neutron backscattering emission and detector can also be used to identify wet insulation which typically indicates corrosion under insulation and this process can be integrated with an artificial intelligence approach. FIG. 5 is a schematic illustration of this process. In a data gathering process 500, in addition to backscattered neutron intensity profiles 502, further sensor data including optical camera (RGB) 504, infrared (IR) thermal camera 506, LiDAR 508 and GPS data 510 is obtained. With this rich set of data, internal and external structures of assets can be visualized in three-dimensions 520. Further analyses, comparisons and interpretations of the data are then performed. An artificial intelligence algorithm, for example, an unsupervised or supervised machine learning algorithm can be employed to make predications 530 as to the state of the asset.

Figure 6:
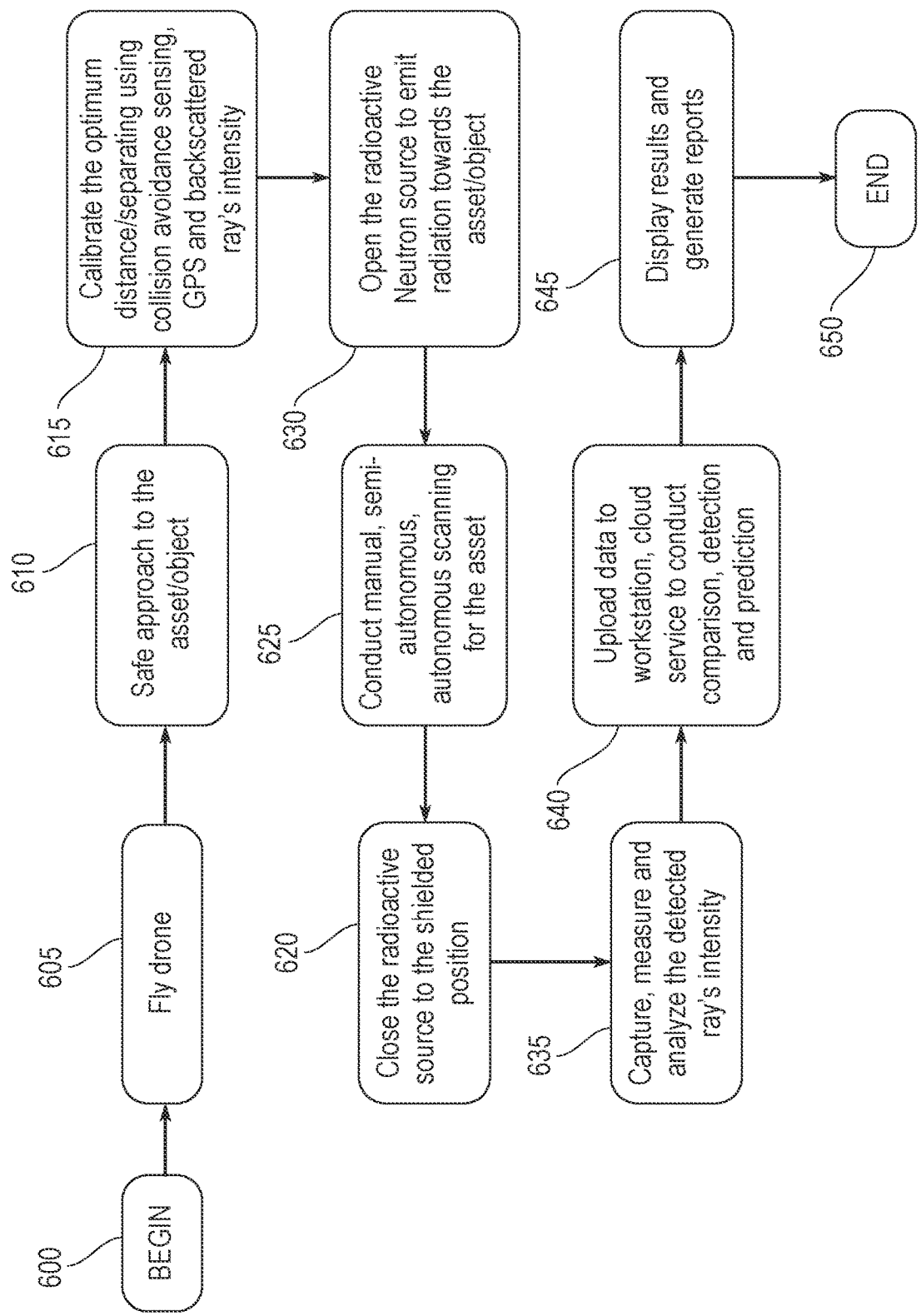
FIG. 6 is a flow diagram of a method of inspection using a drone with neutron emission and detection equipment according to an embodiment of the present disclosure.

FIG. 6 is a more detailed flow diagram of a method for performing an asset inspection according to an embodiment of the present disclosure. The method begins in step 600. In following step 605 the drone is directed to fly to the location of the asset to be inspected. In the following step 610, the drone is controlled to approach the asset safely to avoid a collision. In step 615, as the drone approaches the asset within a close proximity (e.g., 1.5 to 2.5 meters), the control unit determines an optimal distance between the drone and the asset using the GPS sensor and calibrated sensor data (i.e., from a known intensity and sensitivity of the neutron backscattering source and detector). In step 620, the exposure window of the neutron emitter is opened, and neutrons are emitted onto the target asset. The drone is moved manually, semi-autonomously or fully autonomously to scan the asset with neutron emissions in step 625. Upon completion of the scan, the exposure window of the neutron emitter is closed, in step 630. Following the complete of the scan, in step 635 the detected neutron ray intensity is measured and analyzed using the onboard control unit. The data obtained by the drone control unit is uploaded to a workstation or cloud server to perform more advanced processing. Including making comparing the new data to previously obtained data and deriving predictions based on the comparison. In step 640. In step 645, the results of the processing are obtained and reports concerning the state of the asset are generated. The method ends in step 650.

As noted above, the drone apparatus equipped with neutron backscattering equipment according to the present disclosure enables inspection of structural assets that are in highly elevated locations at which conventional practice lead to radiation exposure. In addition, the drone apparatus and method minimize costs of inspection, improve safety, and enables digitalization of inspection records and real time assessment of assets integrity for effective operations.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An apparatus for inspection of a target asset comprising:
   a drone including:
      a body;
      one or more propellers coupled to the body that enable the drone to fly; and
      an electronic control unit having a hardware processor, the electronic control unit coupled to or positioned within the body of the drone and coupled to the one or more propellers;
   a neutron emission source coupled to the body of the drone, communicatively coupled to the electronic control unit, and arranged to radiate neutrons exteriorly toward the target asset; and
   a neutron detector coupled to the body of the drone and also communicatively coupled to the electronic control unit;
   wherein the electronic control unit is configured by code executing in the processor to control navigation of the drone to reach the target asset, to activate the neutron emission source to radiate neutrons onto the asset and to gather data from the neutron detector which detects neutrons backscattered from the asset, indicative of a state of the asset and materials contained within the asset.

2. The apparatus of claim 1, wherein the drone further includes a rechargeable battery coupled to the body and to the electronic control unit.

3. The apparatus of claim 2, further comprising:
   an external power supply; and
   a conductive tether coupled to both the external power supply and the rechargeable battery;
   wherein the rechargeable battery is recharged from the external supply via the conductive tether.

4. The apparatus of claim 1, wherein the drone further includes a GPS sensor coupled to the electronic control unit for aiding in navigation and mapping precise locations at which the target asset is inspected.

5. The apparats of claim 1, wherein the drone further includes an optical sensor for obtaining image information from the target asset.

6. The apparatus of claim 1, wherein the drone further includes an infrared sensor for obtaining thermal images from the target asset.

7. The apparatus of claim 1, wherein the drone further includes a LiDAR sensor for obtaining detailed image information regarding the target asset.

8. A method of inspecting a target asset comprising:
   flying a drone equipped with neutron backscattering emission and detection equipment to the target asset;
   adjusting a distance between the drone and the target asset for inspection with the neutron backscattering emission and detection equipment;
   emitting neutrons from the neutron emission equipment onto the target asset;
   detecting neutrons backscattered from the target using the neutron detection equipment;
   moving the drone to scan over the target asset while emitting neutrons toward and detecting backscattered neutrons from the target asset; and
   assessing the internal content and state of the target asset according to data obtained from detecting the backscattered neutrons.

9. The method of claim 8, further comprising:
   powering the drone using a rechargeable battery incorporated within the drone.

10. The method of claim 9, further comprising:
    connecting the rechargeable battery of the drone to an external power supply for recharging using a conductive tether that allows the drone maneuverability while recharging.

11. The method of claim 8, further comprising determining an exact location of the drone during inspection of the target asset using a GPS sensor while scanning the target asset.

12. The method of claim 8, further comprising scanning the target object with an optical sensor to obtain additional structural information regarding the target asset.

13. The method of claim 8, further comprising scanning the target object with a thermal imaging sensor to obtain additional structural information regarding the target asset.

14. The method of claim 8, further comprising scanning the target object with a LiDAR sensor to obtain additional structural information regarding the target asset.

* * * * *